Patented Nov. 7, 1922.                                              1,434,374

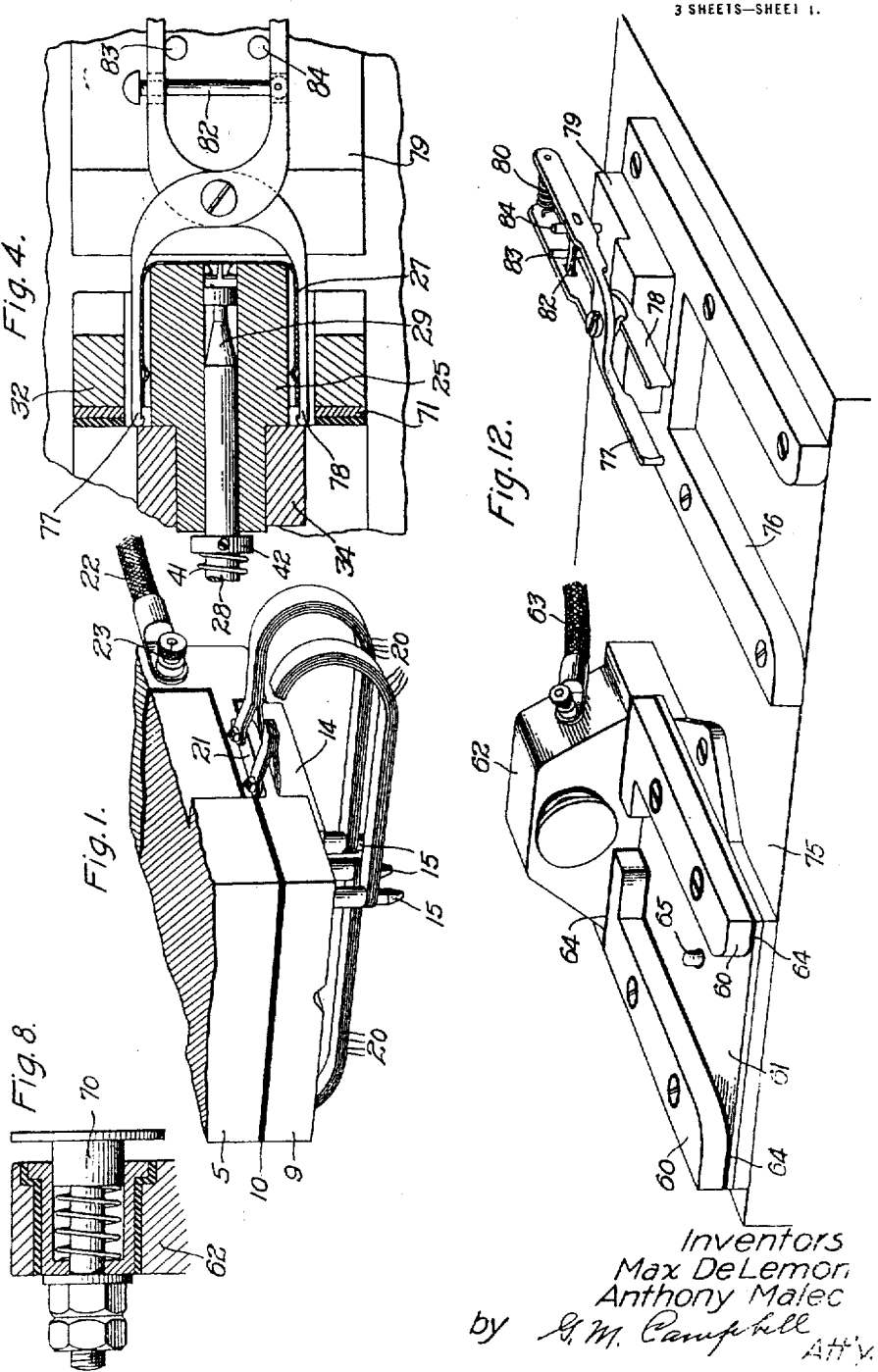

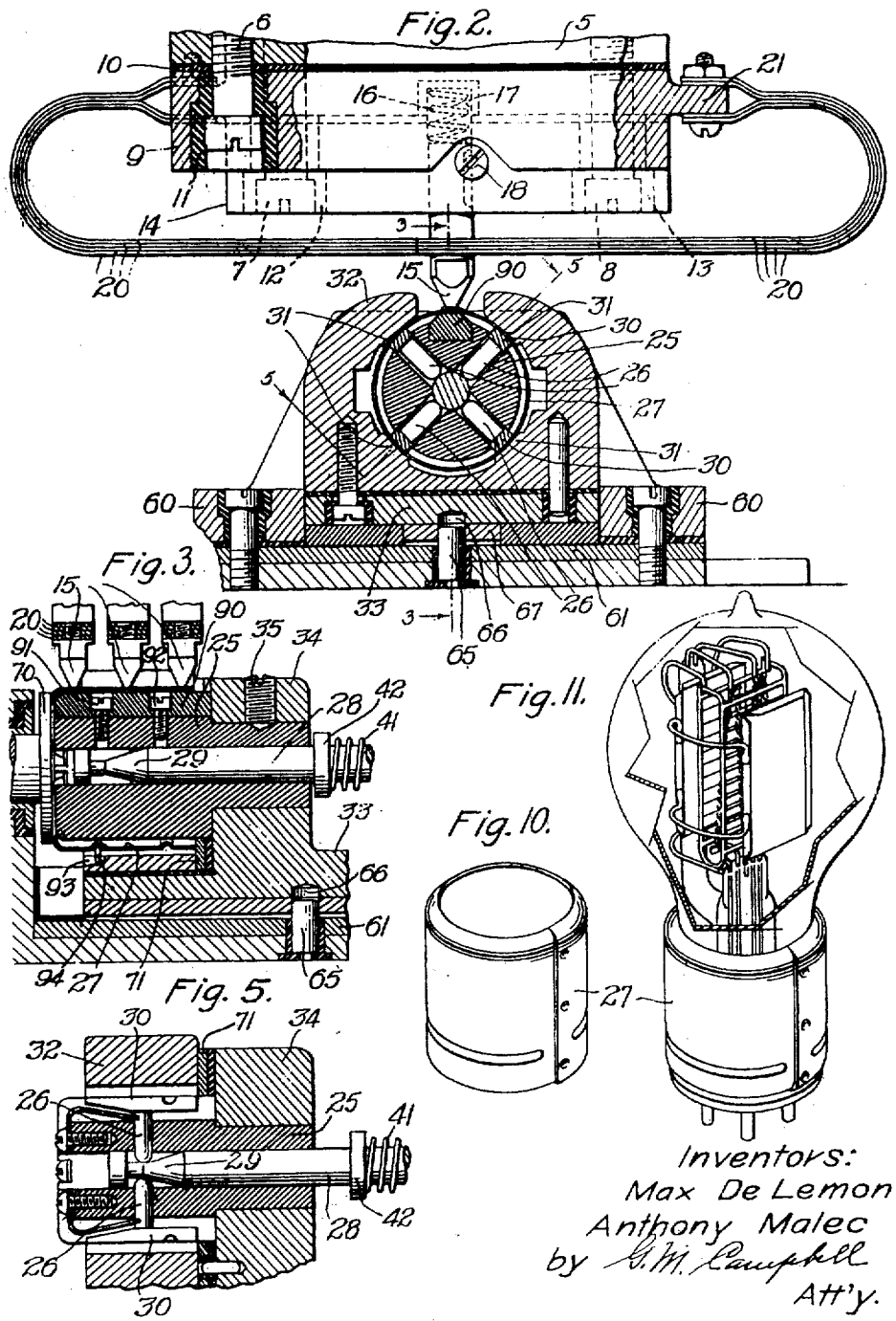

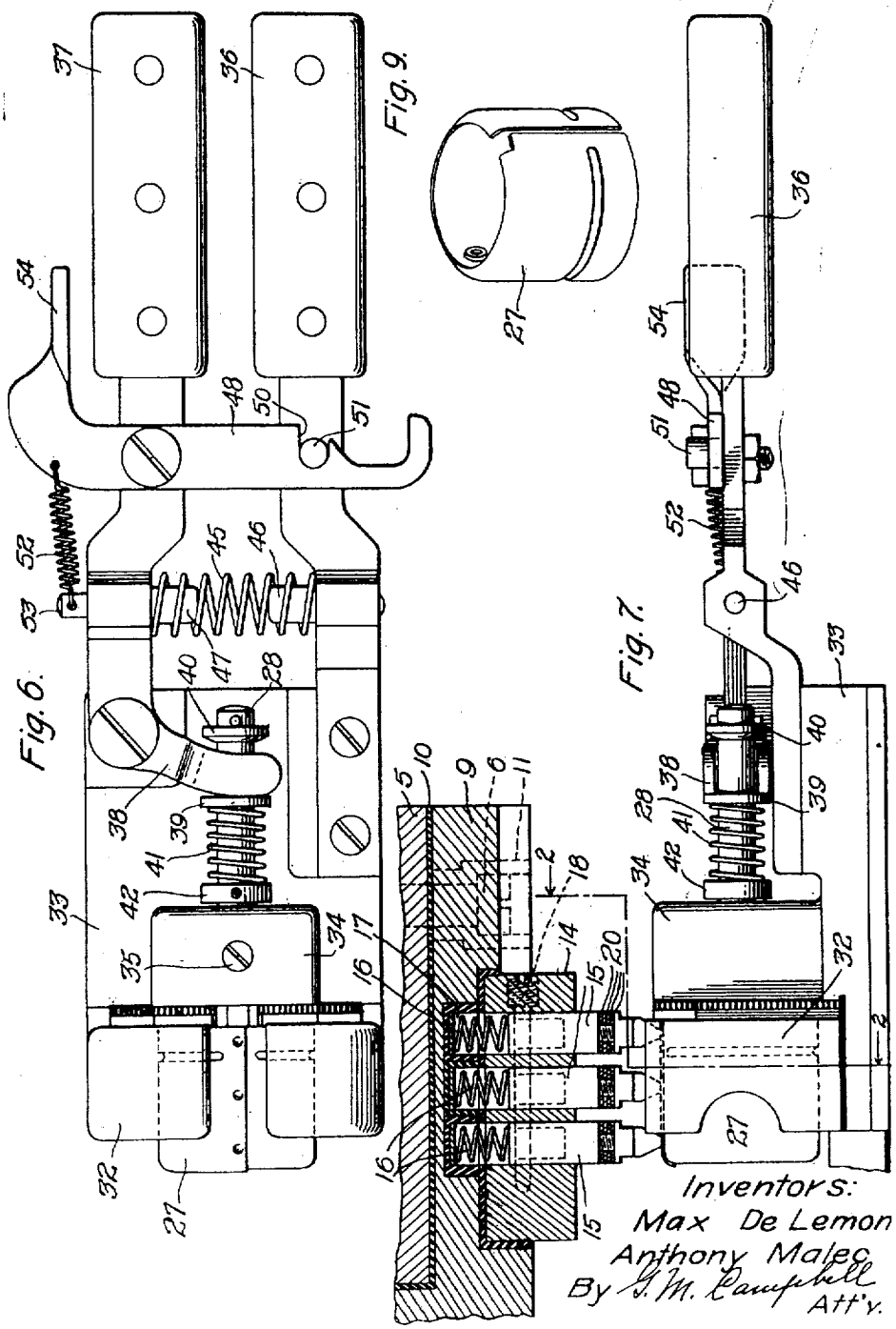

UNITED STATES PATENT OFFICE.

MAX DE LEMON AND ANTHONY MALEC, OF CHICAGO, ILLINOIS, ASSIGNORS TO WESTERN ELECTRIC COMPANY, INCORPORATED, OF NEW YORK, N. Y., A CORPORATION OF NEW YORK.

ELECTRIC RESISTANCE WELDING MECHANISM.

Application filed January 20, 1920. Serial No. 352,842.

*To all whom it may concern:*

Be it known that we, MAX DE LEMON and ANTHONY MALEC, citizens of the United States, residing at Chicago, in the county of Cook and State of Illinois, have invented certain new and useful Improvements in Electric Resistance Welding Mechanism, of which the following is a full, clear, concise, and exact description.

This invention relates to electric resistance welding mechanism, and more particularly to the construction and arrangement of electrodes for welding overlapping surfaces of sheet metal parts in a plurality of points simultaneously.

One of the objects of this invention is to provide a movable electrode carrier for supporting a plurality of electrodes which are adapted to simultaneously engage the work in a plurality of different positions. In connection with this feature of the invention, there is provided a metallic member adapted to be secured to a movable ram and carrying a current carrying member which in turn supports a second member carrying the electrodes. The electrodes are preferably supported by resilient means and resilient connections extend from the current carrying member to the electrodes.

Another object of the invention is to provide a combined electrode and holder by means of which the part to be welded may be handled rapidly and efficiently in a manner to best secure a satisfactory welding connection between the overlapping parts. A combined electrode and holder for this purpose preferably comprises a mandrel, adapted to receive a tubular member, the overlapping surfaces of which are to be welded, and this mandrel is provided with means for expanding the tubular member in place against a gauging surface. The mandrel in turn is supported by means of suitable supporting blocks which are adapted to rest upon a conducting plate to complete an electrical connection between the electrodes and the conducting plate.

Other features of the invention relate to the details of construction and combination of parts as will hereinafter appear and be more fully pointed out in the appended claims.

In the drawings in which the invention is illustrated as applied to the welding of tubular shells for thermionic devices:

Fig. 1 is a perspective view with parts in section of the movable electrode carrier and its connecting means;

Fig. 2 is a transverse cross-sectional view taken upon line 2—2 of Fig. 7;

Fig. 3 is a sectional view taken upon line 3—3 of Fig. 2;

Fig. 4 is a plan view of a mechanism for removing a welded shell from the holder and shows the combined electrode and holder in section;

Fig. 5 is a sectional view taken upon line 5—5 of Fig. 2;

Fig. 6 is a plan view of the combined electrode and holder;

Fig. 7 is a view in side elevation of the combined electrode and holder with the movable electrode carrier shown in section;

Fig. 8 is a detail cross sectional view of a supporting means for a spring pressed plunger which operates in conjunction with the combined electrode and holder;

Fig. 9 is a view in perspective of a shell adapted to be welded by the mechanism of the invention;

Fig. 10 is a view of the device shown in Fig. 9 after the welding operation;

Fig. 11 illustrates a thermionic device with the shell illustrated in Figs. 9 and 10 applied thereto, and Fig. 12 is a perspective view of a mounting plate containing the current carrying member for the combined electrode and tool and also illustrating the mechanism by means of which the finished article is removed from the mandrel.

Referring first to Fig. 2, 5 designates a steel plate which is adapted to be secured, by means not shown, to a movable ram of a welding machine. Mechanically secured to this plate 5 by means of securing bolts 6, 7, and 8 is a copper conducting plate 9 which is suitably insulated from the supporting plate 5 by means of an insulating medium 10 and insulating bushings 11, 12, and 13. Carried by the copper conducting plate 9 is a steel block 14 which is secured to the copper conducting block 9 and the supporting plate 5 but is insulated therefrom. Resiliently mounted in this steel supporting block 14 are a plurality of pointed electrodes 15—15, each of which extends through an opening in the supporting block 14 and has its upper end bearing against a spring 16, the upper end of which is located within an insulated recess 17 within the conducting block 9, as more clearly shown in Fig. 7. A retaining pin 18 removably secured in the supporting block 14 is adapted to engage flattened surfaces on the electrodes 15—15 to retain them in place and at the same time permit a resilient operation thereof. Each of the electrodes 15—15 is connected by means of ribbon conductors 20—20 with the conducting block 9. These conducting ribbons 20—20 are preferably in the form of bowed spring members, one end of which is connected with its associated electrode, the other end being forked and connected with a projecting lug 21 on the conducting block. Current is led to the conducting block 9 through a conductor 22 which is connected therewith by means of a binding post 23. The tips of the electrodes 15—15 are provided with screw threaded studs which are adapted to be received in the body portions of the electrodes, and the lower ends of the conducting ribbons 20—20 are secured to the electrodes by clamping them between the tips and the body portion thereof, as clearly shown in Figs. 3 and 7.

The arrangement of the parts of this electrode carrier provides a rugged construction, and due to the fact that the conducting member is thoroughly insulated from the surrounding parts, the current finds a low resistance path directly from the lead to the electrodes. By reason of the construction of the electrodes whereby tips may be removed without removing the connecting conducting ribbons these electrodes may be easily removed and replaced when they have become worn to the point where they are no longer useful.

The combined electrode and holder comprise in general a mandrel 25 preferably of copper within which are located a plurality of spring pressed plunger members 26—26 adapted to be moved upwardly against the inner surface of a shell 27 by means of a plunger 28 having a conical cam surface 29 thereon which engages the inner ends of the plungers. Upon the outer end of each of the spring pressed plunger members 26 is a strip 30 which in the operation of each of the plungers serves to expand the shell 27 against projecting shoulders 31—31 of a gauge block 32. The gauge block 32 limits the expansion of the shell to a desired outside diameter.

The gauge block 32 is mechanically secured to but electrically separated from a copper base plate 33 which also forms a support for the mandrel 25 which is rigidly secured to a collar portion 34 by means of a set screw 35. The supporting base 33 extends backwardly from the collar portion 34 and has secured to it a pair of hand operating members 36 and 37, the member 36 being rigidly secured to the supporting plate 33, while the member 37 is pivotally supported thereon. At its pivotal end the member 37 is provided with a forked lever arm 38 which engages between collars 39 and 40 on the plunger 28 and is adapted to move the plunger 28 inwardly, thereby operating the plungers 26 through the cam surface 29 thereon to expand the shell 27 against the shoulders 31—31 of the gauge block 32. The movement forward of the plunger 28 is limited by the amount of energy which has been stored in a compression spring 41 interposed between the collar 39 which is slidable on the plunger 28 and a collar 42 secured thereto when the hand operated members 36 and 37 are operated. The relative movement of the members 36 and 37 is against a coil spring 45 which is interposed between the two members 36 and 37 and retained by means of projecting studs 46 and 47. A hand controlled locking member is provided for locking the hand operated members 36 and 27 in their actuated position and comprises a lever 48 which is pivotally supported on the member 37 and is provided with a recessed portion 50 adapted to engage a pin 51 carried by the member 36. A spring 52 having one end connected with the lever 48 and the other with a projection 53 of the lug 47 serves to hold the lever 48 in its locked position. In order to release the lever pressure is applied to a finger portion 54 and upon its release the members 36 and 37 will be forced apart by means of the spring 45 whereupon the plunger 28 will be withdrawn from its forward position, thereby permitting the spring pressed plunger members 26—26 to return to normal position.

The supporting plate 33 is adapted to slide between guides 60—60 provided upon a copper conducting bed plate 61 having an enlarged end portion 62 with which a current conducting lead 63 is connected. The guides 60—60 are preferably of steel and are mechanically secured to the plates 61 but insulated therefrom by means of suitable insulating strips 64—64. Located centrally of the bed plate 61 is a pin 65 adapted to engage a recess 66 in the copper supporting plate 33 to position this plate on the bed plate. A steel insert 67 in the supporting plate 33 is provided with an opening registering with the recess 66 in the plate 33 to prevent excessive wear, due to repeated insertions and removals of the holder between the guides 60—60. A spring pressed plunger member 70 which is supported in the enlarged portion 62 of the plate 61 but insulated therefrom is adapted to engage the end of the shell 27 when the holder is in position and to exert pressure thereon against the action of the plungers 26 to slide the shell against a locating plate 71 in case the operator has not properly positioned the shell on the mandrel against the plate 71 and to maintain the shell in said position during the welding operation. The bed plate 61 is supported upon a supporting plate 75 upon which is also supported a fiber guide 76 which is adapted to receive and guide the supporting plate 33 into position to have spring pressed pivotal jaw members 77 and 78 engage the inner end of the shell 27 to remove it from the mandrel 25 after the release of the plunger 28. As shown in Fig. 12 the jaw members 77 and 78 are pivotally supported upon a block 79 and have rearwardly extending members adapted to be normally drawn together by means of a spring 80, thereby tending to draw the jaw members 77 and 78 toward each other to engage the edge of the shell 27. The movement in one direction of these jaws is limited by means of a pin 82 extending transversely of the rearwardly extending members of the jaws 77 and 78, and in the other direction by means of two vertically arranged pins 83 and 84 secured to the block 79.

The mandrel 25 is provided with an electrode 90 which is removably secured thereto by means of screws 91, 92, as shown particularly in Fig. 3. This is provided for the purpose of easy renewal of the electrode as it becomes worn and pitted from excessive use. This electrode 90 and the tips of electrodes 15—15 are practically the only parts that will be worn to the extent necessitating frequent removals and replacements.

In the operation of this mechanism a shell such as is shown in Fig. 9 is first inserted over the mandrel 25, which may be easily done by squeezing the tube together until it is of sufficiently small diameter to extend between the lugs 31—31 of the collar 32. To facilitate positioning the shell on the mandrel with the overlapping surfaces to be welded positioned between the upper and lower electrodes a slot 93 is provided in the gauge block 32 and into which an outwardly projecting pin 94 enters. The pin 94 is secured to the shell diametrically opposite the overlapping surfaces thereof and is used in the mounting of the finished thermionic device. When in the proper position over the mandrel 25 with its inside edge in contact with the locating plate 71 the hand operating members 36 and 37 are moved toward each other thereby causing the inward or forward movement of the plunger 28 which operates the spring pressed plungers 26—26 and the clamping strips 30—30 to expand the shell 27 against the shoulders 31—31 of the gauge block 32. The lever arm 48 acts automatically to engage the pin 51, thereby locking the members 36 and 37 together to retain the plunger 28 in its forward position. This holder is now inserted between the guide 60—60 on the bed plate 61 with the pin 65 therein engaging the recess 66 of the conducting plate to thereby position the plate and holder so that upon the operation of the ram carrying the electrodes 15—15, these electrodes will strike the overlapping edges of the shell 27 and a circuit will be completed from conductor 22, through the block 9, ribbon conductors 20—20, electrodes 15—15, the overlapping edges of shell 27, electrode 90, mandrel 25, conducting supporting plate 33, bed plate 61, and conductor 63.

After the welding operation the operator will lift the holder from between the guides 60—60 and will insert it with a sliding motion between the guide members of the guide 76, whereupon the jaws 77 and 78 will become engaged with the inner edge of the shell 27 so that when the spring pressed plungers 26—26 are released, due to the separation of the hand operated members 36 and 37, the withdrawal of the tool from this holder will cause the withdrawal of the mandrel 25 from the shell 27. The holder will then be ready for a reloading and a repetition of the foregoing operation.

What is claimed is:

1. In a mechanism for welding overlapping metallic surfaces at a plurality of points simultaneously, a welding head comprising a supporting plate adapted to form a part of a movable ram, a current carrying plate mechanically secured to but electrically separated from said supporting plate, an electrode carrying block mechanically secured to but electrically separated from the current carrying plate, a plurality of electrodes supported in said block but insulated therefrom, and connecting means from said current carrying plate to said electrodes.

2. In a welding mechanism, a welding head including a current carrying plate, an electrode, a removable tip for said electrode, and a current conducting member extending between said plate and said electrode and secured to the electrode by the removable tip.

3. In a mechanism for welding the overlapping surfaces of metal parts, a combined portable electrode and holder for the parts to be welded.

4. In a mechanism for welding the overlapping surfaces of metal members, a portable holder comprising means for gripping and holding a member to be welded, an electrode, and means including said holder to complete a circuit through the electrode.

5. In a mechanism for welding the overlapping surfaces of sheet metal members, a portable holder comprising adjustable contacting means for engaging the member to be welded, an electrode carried by the holder, and means including the holder for completing a circuit through the electrode.

6. In a mechanism for welding the overlapping surfaces of tubular metal members, a holder comprising a mandrel adapted to be inserted into the tubular member, adjustable expanding means carried by the mandrel for expanding the tubular member to a desired size, means to limit the expansion of the tubular member, an electrode carried by the mandrel, and means for completing a circuit through the electrode.

7. In a mechanism for welding the overlapping surfaces of tubular metal members, a holder comprising a mandrel adapted to be inserted into the tubular member, a block provided with lugs surrounding the mandrel, adjustable members carried by said mandrel adapted to expand the tubular member against the lugs, an electrode carried by said mandrel, and means for completing a circuit through said electrode.

8. In a mechanism for welding the overlapping surfaces of a tubular metal member, a holder comprising a mandrel adapted to be inserted into the tubular member, a block provided with inwardly projecting lugs surrounding said mandrel, expanding members carried by said mandrel for expanding the tubular member against the lugs, an electrode carried by the mandrel in a position to engage the tubular member below the overlapping surfaces, and means for controlling said expanding members.

9. In a device for holding tubular metal members for welding the overlapping surfaces thereof, a mandrel adapted to be inserted into the tubular member, a block surrounding said mandrel, expanding means carried by the mandrel adapted to cooperate with the block for maintaining the tubular member in welding position, and a reciprocally operated plunger for controlling the operation of said expanding means.

10. In a device for holding tubular metal members for welding the overlapping surfaces thereof, a mandrel adapted to be inserted into the tubular member, a block with inwardly projecting lugs surrounding said mandrel, a plurality of movable shoe members in the mandrel adapted to cooperate with the block for maintaining the tubular member in welding position, radially disposed plungers in the mandrel for operating the shoe members, and a longitudinally operated plunger extending into the mandrel and provided with a conical surface thereon for controlling the operation of the radially disposed plungers.

11 In a device for holding tubular metal members for welding the overlapping surfaces thereof, a mandrel adapted to be inserted into the tubular member, a block with inwardly projecting lugs surrounding said mandrel, expanding members carried by said mandrel for expanding the tubular member against the lugs carried by said block, a pair of levers for controlling the operation of the expanding members, and means for locking the levers to maintain said expanding members in operated position.

12. In a device for holding tubular metal members for welding the overlapping surfaces thereof, a mandrel for receiving the tubular member, an electrode carried by the mandrel, a supporting conducting plate for the mandrel, a second conducting plate connected with one terminal of a source of energy, and means on said second plate for receiving and positioning the supporting conducting plate.

13. In a device for holding tubular metal members for welding the overlapping surfaces thereof, a mandrel for holding and supporting the tubular member, an electrode carried by and in electrical contact with the mandrel, a supporting conducting plate carrying the mandrel, a second conducting plate connected with one terminal of a source of energy, guide means on said second plate for receiving and positioning said supporting conducting plate, and means carried by said second conducting plate adapted to cooperate with the mandrel to retain the tubular member in welding position.

14. In a device for holding tubular metal members for welding the overlapping surfaces thereof, a mandrel for receiving and holding a tubular member, an electrode carried by and in electrical contact with said mandrel, a supporting conducting plate carrying the mandrel, a second conducting plate connected with one terminal of a source of energy, guide means on said second plate for receiving and positioning said supporting conducting plate with the tubular member in welding position, and a spring pressed plunger carried by said second plate adapted to engage the end of the tubular shell to retain it against longitudinal movement on the mandrel during the welding operation.

15. In a welding mechanism, in combination a holder, a mandrel, for said holder adapted to receive a tubular member and hold it in position for welding the overlapping surfaces thereof, and means for withdrawing the tubular member from the mandrel.

16. In a welding mechanism, in combination a holder, a mandrel adapted to receive a tubular member to be welded, expanding means associated with said mandrel for securing the tubular member in welding position, means for operating said expanding means, and means for gripping and withdrawing the welded member from the mandrel after the release of said expanding means.

17. In a welding mechanism, in combination, a holder, a mandrel for said holder adapted to receive a tubular member to be welded, a plate, a guide means on said plate adapted to receive and position said holder for welding the tubular member, a second guide means associated with said plate for receiving said holder, and means associated with said second guide means for withdrawing a welded member from the mandrel.

18 In a device for holding metal members for welding the overlapping surfaces thereof, a portable mandrel adapted to be inserted into the tubular member, and an electrode removably secured to said mandrel.

19 In a mechanism for welding metallic members, a movable ram, an electrode carried thereby and having one terminal of a source of welding current connected therewith, a removable holder for the member to be welded, an electrode carried by the holder, and a stationary plate adapted to receive the removable holder and to form therewith a path for the welding current completed upon the operation of the movable ram.

In witness whereof, we hereunto subscribe our names this 30th day of December, A. D., 1919.

MAX DE LEMON.
ANTHONY MALEC.